United States Patent [19]

Bach et al.

[11] Patent Number: 5,688,029
[45] Date of Patent: Nov. 18, 1997

[54] ANTI-SLIP CONTROL

[75] Inventors: Thomas Bach, Koblenz; Stefan Helbing, Kruft; Josef Knechtges, Mayen; Hubert Schmitt, Ochtendung, all of Germany

[73] Assignee: Lucas Industries public limited company, Great Britain

[21] Appl. No.: 591,437
[22] PCT Filed: Jul. 11, 1994
[86] PCT No.: PCT/EP94/02260
   § 371 Date: Jan. 12, 1996
   § 102(e) Date: Jan. 12, 1996
[87] PCT Pub. No.: WO95/02528
   PCT Pub. Date: Jan. 26, 1995

[30] Foreign Application Priority Data

Jul. 12, 1993 [DE] Germany .................. 43 23 275.2

[51] Int. Cl.$^6$ ........................................ B60T 8/72
[52] U.S. Cl. .................. 303/139; 303/148; 364/426.028
[58] Field of Search ........................ 303/132, 139, 303/148, 149, 150, 163, 164, 167; 364/426.028; 180/197

[56] References Cited

U.S. PATENT DOCUMENTS

| | | | |
|---|---|---|---|
| 3,535,004 | 10/1970 | Howard et al. | |
| 4,484,280 | 11/1984 | Brugger et al. | 364/426 |
| 4,950,037 | 8/1990 | Kopper et al. | 303/110 |

FOREIGN PATENT DOCUMENTS

| | | |
|---|---|---|
| 0088894A3 | 9/1983 | European Pat. Off. . |
| 0345753A1 | 12/1989 | European Pat. Off. . |
| 0449333A2 | 10/1991 | European Pat. Off. . |
| 3914211A1 | 11/1989 | Germany . |
| 4022471A1 | 1/1992 | Germany . |
| 2237084A | 4/1991 | United Kingdom . |

*Primary Examiner*—Robert J. Oberleitner
*Assistant Examiner*—Pamela J. Lipka
*Attorney, Agent, or Firm*—Wood, Herron & Evans, L.L.P.

[57] ABSTRACT

A method for preventing the driven wheels of an automotive vehicle from spinning provides that whenever one of two driven wheels of one axle of the vehicle has a lower friction coefficient with the road surface than the other wheel of said axle and the one wheel shows a spinning tendency, brake pressure is built up at said wheel, with the rotational speed of the other wheel being measured, and whenever the rotational speed exceeds a specified value with respect to a vehicle reference speed, the brake pressure at the one wheel is reduced or maintained constant.

2 Claims, 1 Drawing Sheet

ANTI-SLIP CONTROL

The invention relates to the so-called anti-slip control (ASC), i.e. to a method for preventing the driven wheels of a vehicle from spinning.

Such ASC systems are also referred to as TC (traction control) systems.

The driven wheels of a vehicle always have a tendency to spin when the vehicle engine generated driving torque at the wheel is higher than the torque based on the momentary friction coefficient that can be transmitted via the wheels to the road.

Similar to block-protected braking (ABS), not only the driving torque that can be transmitted from the wheel to the road surface in the driving direction decreases with increasing traction slip after exceeding a maximum value, but also the cornering force of the wheels decreases to very low values after exceeding a maximum.

From the state of the art traction slip controllers are known, where on the one hand spinning of the driven wheels is prevented by reducing the drive power of the engine in the case of a spinning tendency of a wheel. On the other hand, traction slip controllers are known, where in the case of a spinning tendency of a driven wheel, the brake of that wheel is automatically actuated in order to improve the traction of that wheel. The state of the art generally provides for controlling both driven wheels of one axle on the basis of their individual rotation behaviour with respect to traction.

If, for example, one wheel of the axle shows a spinning tendency significantly before the other wheel (because the one wheel runs on a smoother road surface), the brake of the wheel that is the first to show a spinning tendency is supplied with brake pressure. When using a differential gear, the consequence for the respective axle is that the other driven wheel (not yet showing a spinning tendency) transmits a higher driving torque to the road surface.

With this known traction control system, the wheel which has first become instable (i.e. the wheel which is the first to show a spinning tendency) is being braked as long as is required by the rotational speed of the wheel. In other words: as long as the rotational speed of the wheel is exceeding a given threshold value, it is braked in order to prevent spinning.

If the other wheel which at first was stable also shows a spinning tendency, then this wheel is also braked accordingly.

DE 40 22 471 A1 discloses a traction control system for increasing the driving stability, where the driven wheel which momentarily shows a higher friction coefficient is determined, and the rotational speed of this wheel is monitored and stabilized by a braking effect. A brake pressure prevailing in the wheel brake of the second driven wheel of the same vehicle axle will be relieved. The control is therefore completely based on the rotational behaviour of the stable wheel, the brake pressure of which is controlled as a function of its rotational speed.

The present invention is based on the objective to provide a (convenient) anti-slip control system which annoys the driver as little as possible, which can function with a simple control algorithm, and which imposes only minimum load on the vehicle components.

First, the invention is based on the following finding:

With a conventional traction control system, in particular with rapidly changing friction coefficients between the wheel and the road surface, large variations of the braking torques prevailing at both wheels of one axle occur, and this leads to an extreme load acting on the gears, bearings and transmissions, particularly in the case of a vehicle axle with a so-called differential. This highly impairs the durability and the life of the drive train of the vehicle.

With conventional traction control systems, such loading of the components occurred particularly whenever both wheels of a drive axle are coupled via a differential. In the case of one wheel of the axle coming into the instable range, i.e. showing a spinning tendency, it will be braked down by the actuation of its wheel brake to a lower rotational speed. Because of the differential, this again results in the other wheel, which has a higher friction coefficient and which is therefore still running stably, generating a higher drive torque and therefore being at risk to spin itself. This spinning tendency might be so strong that the cornering stability is affected significantly. If this second wheel which has become instable at a later time is also braked, the above mentioned high loads result, thus causing wear of the braking system, the clutch and the transmission.

The above mentioned objective is achieved by the invention with an anti-slip control system for a two-track automotive vehicle in such a manner that whenever one of two driven wheels of one axle of the vehicle has a lower friction coefficient with the road surface than the other wheel of said axle and the one wheel shows a spinning tendency, a brake pressure is built up at this wheel while the rotational speed of the other wheel is measured, and, with the rotational speed exceeding a specified value with respect to a vehicle reference speed, the brake pressure at the one wheel is relieved or kept constant.

A main characteristic of the anti-slip control system according to the invention therefore is that whenever a significant difference in the friction coefficients of the two driven wheels of one axle occurs, the brake pressure at only one of the two wheels, namely that wheel which is the first to become instable, is essentially increased automatically, with the rotational behaviour of the still stable wheel being measured and the brake pressure in the wheel brake of the firstly instable wheel being controlled as a function of the rotational speed of the still stable wheel over the course of time. The overall control is therefore essentially reduced to a single wheel, namely to the wheel which is the first to become instable which runs on a smoother road surface, where the essential parameters for the control of the brake pressure in this wheel which is the first to become instable are the rotational properties of the still stable wheel.

According to the invention it is not attempted, as has been the general practice with the state of the art, to prevent the wheel that is the first to become instable from spinning, but rather the invention is based on the idea to maintain the wheel running on a good road surface (with a high friction coefficient) within the optimum range of the slip curve and, thus, ensure the maximum traction and the highest possible cornering force.

The invention can advantageously be applied both to two and to four wheel driven vehicles, in the latter case particularly when there is no rigid drive-through engaged. In this case, a relief of the centre differential lock in particular can be noted.

In the following, an embodiment of the invention will be described more detailed with reference to the drawing in which.

Figure 1:
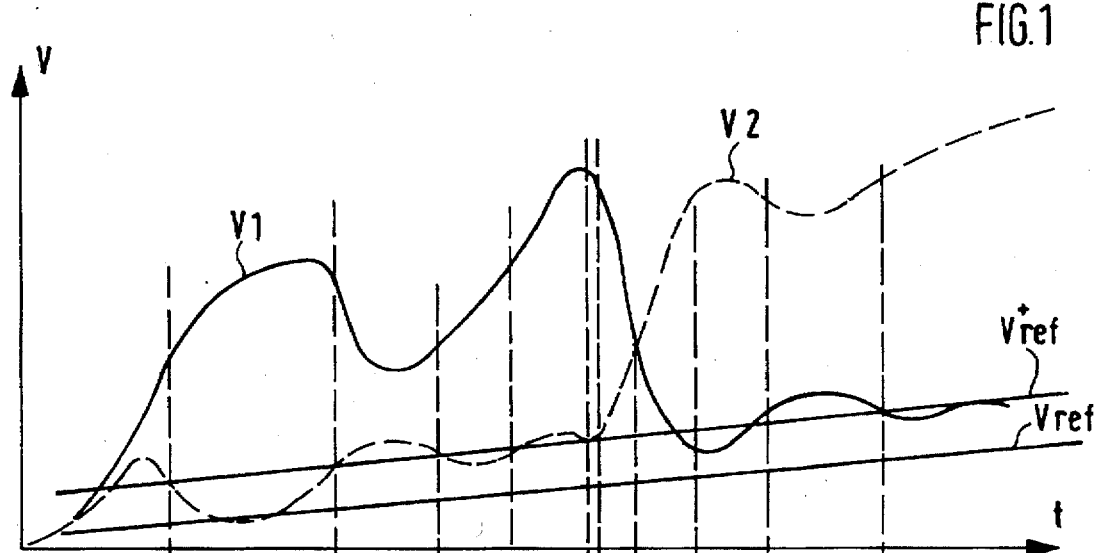
FIG. 1 shows the rotational speed vs. time of the two driven wheels of the same axle of a vehicle, and the so-called vehicle reference speed vs. time, as it is known from the ABS and ASC technology.
Figure 2:
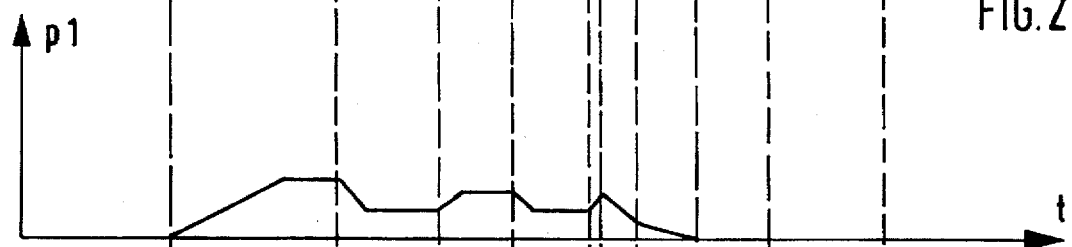
FIG. 2 shows the brake pressure vs. time in the wheel brake of a first wheel, the rotational speed of which is indicated in FIG. 1 as $v_1$.
Figure 3:
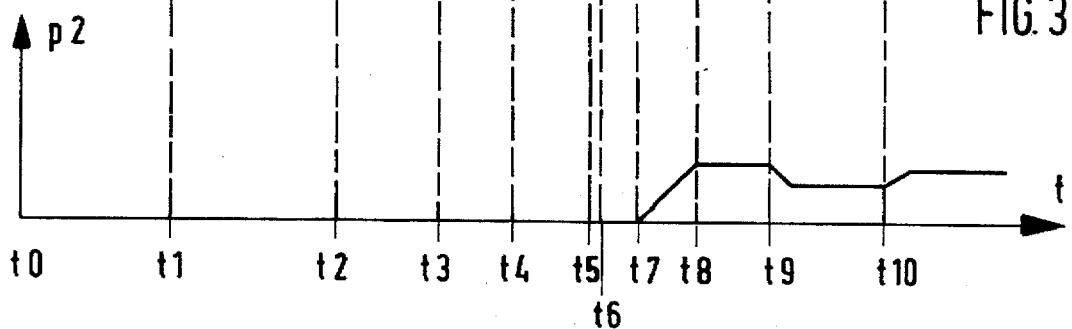
FIG. 3 shows the brake pressure vs. time in the wheel brake of a second wheel of the same axle of the vehicle, the rotational speed of which is indicated in FIG. 1 as $v_2$.

As can be seen in the drawing, FIGS. 1, 2 and 3 have the same time axis t, respectively.

FIG. 1 shows a typical curve of the rotational speed of the two driven wheels of a drive axle of a vehicle during a starting process on an inhomogenous road surface. It is assumed that one wheel of the axle runs on a relatively smooth road surface, namely that wheel the rotational speed of which is indicated as $v_1$ in FIG. 1, while the other wheel runs on a relatively non-skidding road surface; its rotational speed is indicated as $v_2$ in FIG. 1.

The ASC control algorithm according to the invention is only applied when a distinct difference in the friction coefficients of the two driven wheels has been detected. Such a difference in the friction coefficients can be detected, for example, by the fact that over a given period of time the rotational speed of the one wheel increases considerably more than the rotational speed of the other driven wheel of the same vehicle axle. See also FIG. 1.

The curves of the rotational speeds $v_1$ and $v_2$ according to FIG. 1 are based on the assumption that the attempt to start begins at time $t_0$, i.e. the driver engages the clutch and accelerates. The rotational speed $v_1$ of the first wheel increases steeply, while the rotational speed $v_2$ of the second wheel (broken line) increases less steeply and, at a time $t_2$ drops below a threshold value $v^+_{ref}$. According to FIG. 1, the threshold value $v^+_{ref}$ differs from the vehicle reference speed $v_{ref}$ which is known as such by a constant value. The fact shown in FIG. 1 that at time $t_1$ the rotational speeds $v_1$ and $v_2$ of the two driven wheels differ by more than a specified value, or, respectively, the condition that at a high rotational speed $v_1$ of the first wheel the rotational speed $v_2$ of the second wheel drops below the threshold value $v^+_{ref}$, indicate that the one wheel ($v_1$) runs on a considerably smoother road surface than the other wheel ($v_2$). This is why the ASC control algorithm described in the following is applied.

Thus, at time $t_1$ the rotational speed $v_1$ of the first wheel increases further while the rotational speed $v_2$ of the second wheel drops below the threshold value $v^+_{ref}$. The latter fact indicates that the second wheel ($v_2$) runs stably.

According to FIG. 2, the brake pressure $p_1$ in the wheel brake of the first wheel is increased at time $t_1$. As can be seen from FIG. 3, the brake pressure $p_2$ in the wheel brake of the second wheel ($v_2$) is not increased over the entire time span between $t_1$ and $t_7$.

The course of the rotational speed $v_2$ of the second wheel (broken line in FIG. 1), however, is closely monitored, and the brake pressure $p_1$ in the wheel brake of the first wheel is controlled according to FIG. 2 as a function of the rotational speed $v_2$ with respect to the threshold value $v^+_{ref}$.

Upon braking of the wheel which is the first to spin ($v_1$) that occurs following time $t_1$, the counter force is increased on that side of the axle differential where the first wheel is arranged, and therefore a higher drive torque is transmitted to the second wheel which is arranged at the other side of the axle differential, i.e. the second wheel reaches an optimum range of the friction coefficient/slip curve.

According to FIG. 2, the brake pressure $p_1$ in the wheel brake of the first wheel is increased to a maximum value and then maintained constant until time $t_2$. At time $t_2$ the rotational speed $v_2$ of the second wheel has reached (exceeded) the threshold value $v^+_{ref}$ again, and therefore, following time $t_2$, the brake pressure $p_1$ is reduced according to FIG. 2 and, upon reaching a specified value, maintained constant until a time $t_3$. At time $t_3$, the rotational speed $v_2$ of the second wheel decreases below the threshold value $v^+_{ref}$ again, and similar to the above described process, the brake pressure $p_1$ in the wheel brake of the first wheel is increased again.

At time $t_4$, the rotational speed $v_2$ of the second wheel exceeds the threshold value $v^+_{ref}$ again, and the brake pressure $p_1$ in the wheel brake of the first wheel is correspondingly reduced again and then maintained constant (see also FIG. 2). With each reduction of the brake pressure $p_1$ in the brake of the first wheel, the torque which the drive applies to the second wheel because of the differential gear is also reduced, so that the rotational speed of the second wheel again reaches the optimum range about the threshold value $v^+_{ref}$ (see FIG. 1).

Although such a reduction of the brake pressure $p_1$ causes more spinning of the first wheel during the time interval from $t_4$ to $t_5$, however, as explained above, the second wheel always returns into the optimum slip range. Under the described conditions, the second wheel is not braked at all, see also FIG. 3, time span $t_0$ to $t_7$, during which no brake pressure p2 is supplied to the wheel brake of the second wheel.

FIGS. 1, 2 and 3 also illustrate the case of abruptly changing road conditions, in that the first wheel ($v_1$) which was initially running on a very smooth road surface, reaches a very non-skidding road surface at time $t_5$, while at the immediately following time $t_6$ the second wheel, which was initially running on a very non-skidding road surface, reaches a very smooth road surface. Such a "checkered" friction coefficient change between the wheels constitutes the most difficult extreme case for an anti-slip control system.

As shown in FIG. 1, the rotational speed $v_1$ of the first wheel drops considerably after time $t_5$, while the rotational speed $v_2$ of the second wheel increases considerably after time $t_6$. This can be explained directly from the previously assumed friction coefficient relations. From the abrupt inverse change of the rotational speeds $v_1$ and $v_2$, the computer of the ASC system detects that the friction coefficients between the wheels and the road surface have changed dramatically. When such a situation prevails, the brake pressure must be transferred as quickly as possible from the one wheel into the wheel brake of the second wheel, as can be seen from comparing FIGS. 2 and 3. Such an extreme, checkered change of the friction coefficients from one wheel to the other is the only situation where it is appropriate for the control algorithm according to the invention to accept pressure in the brakes of both wheels, which is the case during the time span between $t_7$ and $t_8$, as shown in FIGS. 2 and 3. The simultaneous pressure reduction in the first wheel and the pressure build-up in the second wheel as intended here are advantageous in that they enable a smooth transition and a minimum acceleration drop. Under the aspect of preserving the materials (life of the components), too, the short time span from $t_7$ to $t_8$ with simultaneous braking on both sides is not detrimental, because in the previously braked first wheel only a very small decreasing pressure exists, while during this time span the pressure built up in the second wheel has not reached very high values. Following time $t_7$, the second wheel will now be the instable one, contrary to the above description, so that the brake pressure $p_2$ in the wheel brake of the second wheel will be controlled according to FIG. 3 depending on the relation of rotational speed $v_1$ of the first wheel to the threshold value $v^+_{ref}$. The control is effected completely analogously as described above, only with the wheels exchanged.

We claim:

1. A method for preventing the driven wheels of an automotive vehicle from spinning, where whenever a first wheel of two driven wheels of an axle of the vehicle provided with an axle differential has a lower friction coefficient with the road surface than a second wheel of that axle, and the first wheel shows a spinning tendency, but not the second wheel, a brake pressure is built up at the first wheel, and then the rotational behavior of the second wheel which does not show a spinning tendency is measured and evaluated so that whenever the rotational speed of the second wheel exceeds a threshold value ($v^+ref$), the brake pressure at the first wheel is temporarily relieved, and whenever the rotational speed of the second wheel drops below the threshold value ($v^+ref$), the brake pressure at the first wheel is temporarily built up.

2. The method of claim 1 wherein upon an eventual increase of the spinning tendency of the second wheel, with a corresponding reduction in the spinning tendency of the first wheel to a quantity lower than that of the second wheel, the rotational behavior of the first wheel which does not show a spinning tendency is measured and evaluated so that whenever the rotational speed of the first wheel exceeds a threshold value ($v^+ref$) the brake pressure at the second wheel is temporarily relieved and whenever the rotational speed of the first wheel drops below the threshold value ($v^+ref$) the brake pressure at the second wheel is temporarily built up, thereby permitting a transitional time period during which braking of the first and second wheels occurs simultaneously, the transitional time period commencing when the rotational speed of the second wheel becomes equal to the rotational speed of the first wheel.

* * * * *

UNITED STATES PATENT AND TRADEMARK OFFICE
CERTIFICATE OF CORRECTION

PATENT NO. : 5,688,029
DATED : November 18, 1997
INVENTOR(S) : Thomas Bach, Stefan Helbing, Josef Knechtges, and Hubert Schmitt It is certified that error appears in the above-indentified patent and that said Letters Patent is hereby corrected as shown below:

Column 3, Line 27, "time $t_2$" should read --time $t_1$--.

Column 4, Line 22, "pressure p2" should read --pressure $p_2$--.

Signed and Sealed this

Second Day of June, 1998

Attest:

BRUCE LEHMAN

Attesting Officer

Commissioner of Patents and Trademarks